Oct. 19, 1965     R. J. SMITH     3,212,405
METHOD FOR CUTTING INTERNAL SPHERICAL SURFACES
Filed July 24, 1963     2 Sheets-Sheet 1
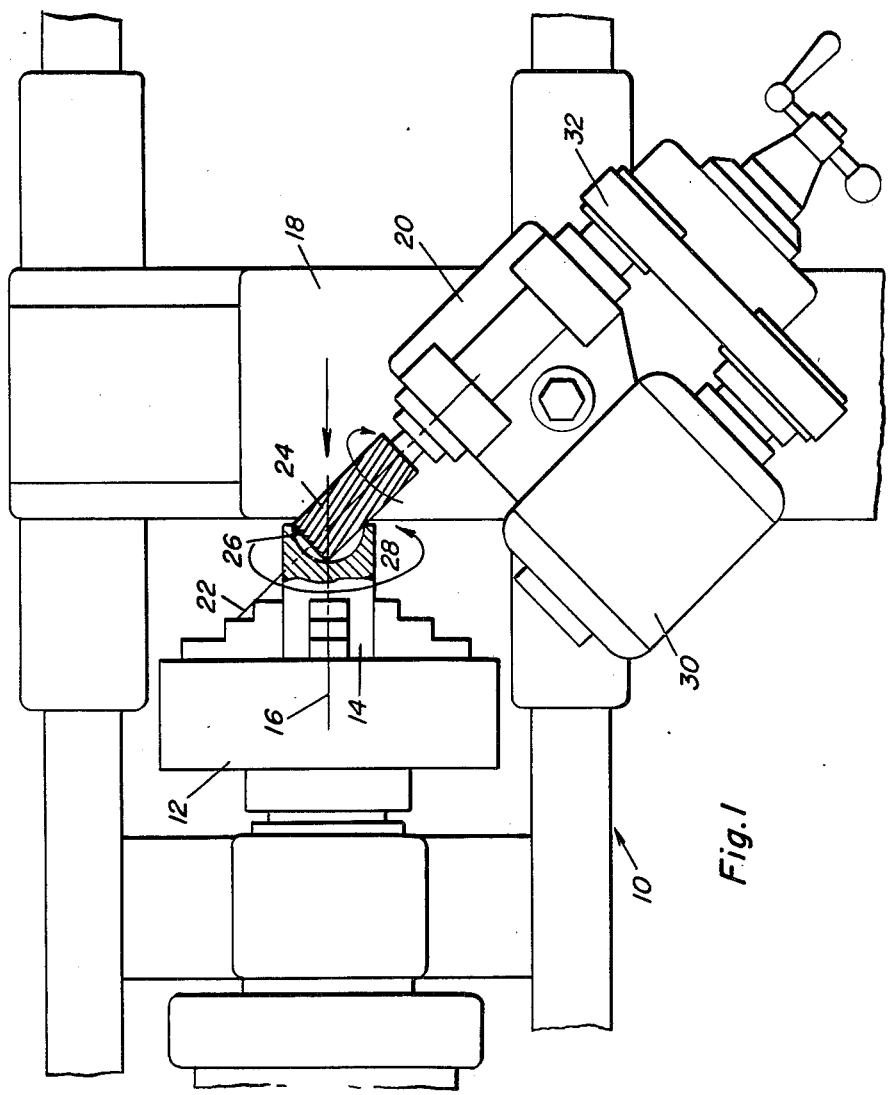
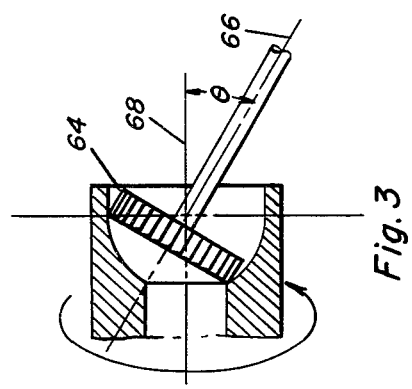
Richard J. Smith
INVENTOR.

Oct. 19, 1965   R. J. SMITH   3,212,405
METHOD FOR CUTTING INTERNAL SPHERICAL SURFACES
Filed July 24, 1963   2 Sheets-Sheet 2

Richard J. Smith
INVENTOR.

United States Patent Office 3,212,405
Patented Oct. 19, 1965

3,212,405
METHOD FOR CUTTING INTERNAL
SPHERICAL SURFACES
Richard J. Smith, Canoga Park, Calif., assignor of fifty percent to Helen Sue Smith, Canoga Park, Calif.
Filed July 24, 1963, Ser. No. 297,421
3 Claims. (Cl. 90—11)

This invention relates to a new and useful method and associated apparatus for generating spherical surfaces on workpieces and more particularly to a method for cutting internal spherical surfaces within workpieces.

The machining of internal spherical surfaces of predetermined diameters and with reference to predetermined centers of curvature, has been difficult to achieve with any degree of accuracy and has required expensive and time-consuming grinding procedures, as well as costly tools and apparatus. It is therefore a primary object of the present invention to provide a method for cutting such spherical surfaces with accuracy by a relatively simple procedure and with inexpensive apparatus and tools.

The method of the present invention for achieving the aforementioned objective, is based upon the geometric principle that the intersection of a plane with a sphere is a circle, the center of which lies on an axis perpendicular to the plane containing the center of curvature of the sphere. In accordance with the foregoing geometric relationship, the method of the present invention involves the rotation of a cutting tool about a cutting axis so that the cutting tooth or teeth, form a cutting circle defining the plane intersection of the desired spherical surface, the center of curvature of which lies on the cutting axis. Accordingly, generation of the spherical surface will occur when the workpiece in which the surface is to be formed, is also rotated about an axis which intersects the cutting axis at the center of curvature. Thus, a rotating cutting tool establishing a cutting circle of a diameter preferably less than the desired diameter of the spherical surface within the workpiece, may be fed into the workpiece with its cutting axis held at a predetermined angle to the work axis until the cutting axis intersects the work axis at the desired center of curvature. An internal spherical surface may thereby be formed in the workpiece in a simple and accurate manner and may also be located with respect to a predetermined center of curvature and dimensioned by adjustment of the angle of intersection between the cutting axis and the work axis in relation to the diameter of the cutting circle established by the cutting tool.

An important object of the present invention therefore, in accordance with the foregoing objects, is to provide a method for cutting an internal spherical surface in a rotating workpiece by feeding a rotating cutting tool parallel to the work or cutting axis with the cutting tool being rotated about the cutting axis that intersects the work axis at a predetermined angle, the cutting tool having at least one tooth with an outer point establishing a cutting circle at the forward end thereof that generates the spherical surface within the rotating workpiece.

An additional object of the present invention in accordance with the foregoing objects, is to provide a method for cutting an internal spherical surface tangent to an internal cylindrical bore within a workpiece or spaced therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of typical apparatus that may be used in performing the method of the present invention.

FIGURE 3 is a diagrammatic sectional view showing the application of the method of the present invention to one form of workpiece.

Figure 4:
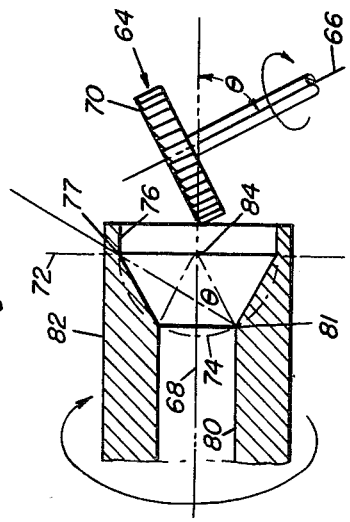
FIGURES 4 and 5 are diagrammatic sectional views illustrating the application of the method of the present invention to different forms of workpieces.

Referring now to the drawings in detail, it will be observed from FIGURE 1, that the method of the present invention may be practiced utilizing any basic machine tool such as the lathe 10 having a work holding chuck 12 whereby a workpiece 14 may be rotated about a fixed work axis 16. Slidably mounted by the lathe 10 for feeding movement in a direction parallel to the work axis 16, is a tool feed carriage 18 on which a tool post 20 is mounted in angularly adjusted position. Rotatably mounted by the tool post 20 for rotation about a cutting axis 22, is a cutting tool 24. The cutting tool 24 as illustrated in FIGURE 1, is in the form of an end mill cutter. It should be appreciated however, that any other multi-tooth saw-like cutting tool may be utilized or a single point boring bar if desired. In all cases however, the cutting tool establishes a cutting circle at the forward end 26 thereof when rotated about the cutting axis 22, this cutting axis being positioned by the tool post 20 for intersection with the work axis 16 at a predetermined adjustable angle thereto. The cutting tool 24 may therefore be fed into the rotating workpiece by means of the carriage 18 in a direction parallel to the work axis so as to maintain the predetermined angle between the work axis 16 and the cutting axis 22. It is also essential, that the diameter of the forward end 26 be at most equal to or less than the diameter of the internal spherical surface 28 to be cut. Also, rotation must be imparted to the cutting tool about its cutting axis at a speed that is relatively high as compared to the rotational speed of the workpiece. Toward this end, a tool motor 30 may be mounted on the tool post 20 and drivingly connected to the drive chuck for the cutting tool by means of the belt drive 32. Also, the cutting tool 24 is preferably rotated in a direction opposite to the rotational direction of the workpiece, although of little consequence at high speeds.

Figure 2:
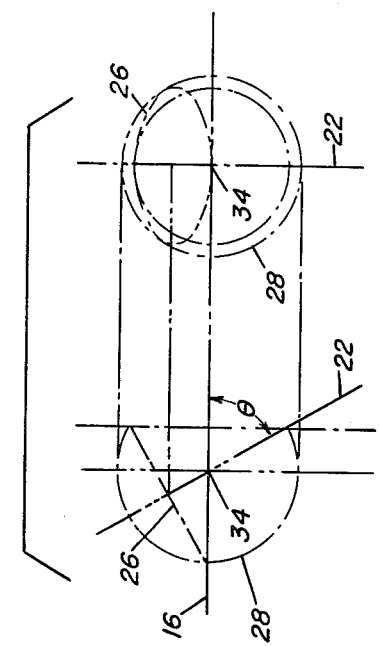
FIGURE 2 is a geometric illustration of the underlying principles of the present invention.

Referring now to FIGURE 2, it will be observed that the spherical surface 28 when interested by a plane perpendicular to the cutting axis 22 conforms to the cutting circle 26 established at the forward end of the cutting tool. Accordingly, rotation of the cutting tool about the cutting axis 22 would cut a circle on the spherical surface 28 generated by virtue of the rotation of the workpiece about the work axis 16. Thus, the center of curvature 34 of the spherical surface 28 will be located at the intersection of the work axis 16 with the cutting axis 22. It will also be appreciated, that the cutting action of the tool would produce a cross hatched pattern as the cutting tooth rotates at a relatively high speed in one rotational direction opposed to the relatively low rotational speed of the workpiece but more particularly because of the angular relationship between the work and cutter axes. By selection of the proper radius for the cutting teeth, an extremely low surface profile pattern of tool marks will result particularly suited for lubrication-retaining purposes. Also, it will be appreciated from the geometric relationships illustrated in FIGURE 2, that the radius or diameter of the cutting circle 26 must be equal to or smaller than the radius or diameter of the spherical surface 28 and that the diameter of the spherical surface will be equal to the diameter of the cutting circle divided by the sine of the angle between the work axis 16 and the cutting axis 22, where the cutting circle 26 is tangent to the work axis.

From the foregoing it will be apparent that the radius of curvature of the surface to be cut may be selected for a cutter having a cutting circle of a given diameter, by merely setting the cutter axis at a predetermined angle to the work axis and feeding the rotating cutter into the rotating workpiece at said angle along the work axis as shown in FIGURE 1. The spherical surface may also be so cut in a workpiece having a previously machined bore utilizing several methods to obtain a spherical surface which is either tangent or non-tangent to the bore. For example, the cutter at its preset angle to the work axis could be advanced along the work axis to a desired location within the bore with its cutting circle spaced from the bore surfaces. The cutter is then moved perpendicular to the work axis so as to bring its cutting circle into tangent relation to the bore surface. Alternatively, the cutter may be positioned at its present angle with the cutting circle slightly spaced from the work axis and advanced along the work axis to a position spaced from the final cutting position. The cutter may then be moved in a direction along its own cutting axis to bring the cutting circle into contact with the previously cut bore surface.

Figure 6:
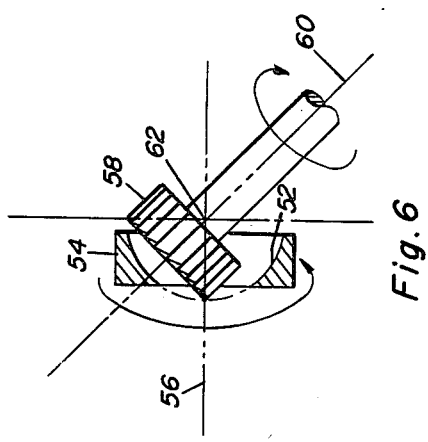
FIGURE 6 illustrates a still further application of the invention.

A partial spherical surface 52 may be cut in a similar fashion within a disk type of workpiece 54 rotated about the work axis 56 by use of a milling cutter 58 rotated about the cutting axis 60 which is fed in a direction parallel to the work axis 56 to a location so as to establish the center of curvature 62 for the spherical surface 52 spaced forwardly of the workpiece as shown in FIGURE 6. Although the cutting axes for the cutting tools as described with respect to FIGURES 1 and 6, are disposed at a 45° angle to the work axes, it will be appreciated that the angle may be preset to some other lower value in which case the forwardmost point on the cutting circle may not be on the work axis as shown for example in FIGURE 3.

Figure 5:
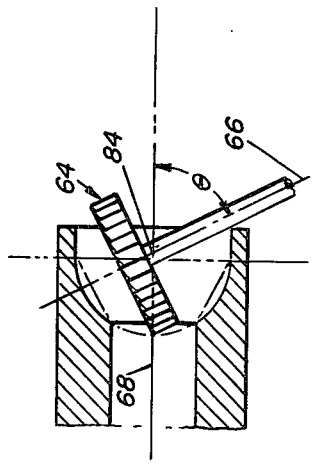

Referring now to FIGURES 4 and 5, one exemplary application of the invention is illustrated in connection with the formation of a curved transition surface 74 between two axially aligned bores 76 and 80 previously cut in a workpiece 82. As shown in FIGURE 4, the cutter 64 is positioned at an angle between the cutting axis 66 and work axis 68 so as to predetermine the radius of curvature of the surface as the trigonometric function of the radius or diameter of the cutting circle 70 as hereinbefore explained. However, it also required that the cutter cut the spherical surface between the intersection 81 of bore 80 with a sphere, the surface 74 of which forms an intersection 77 with the plane 72 at which the sphere is tangent to the bore 76. The radius of curvature and location of the center of curvature 84 is calculated accordingly and with the cutter positioned at the proper angle, it is advanced to the position illustrated in FIGURE 5 wherein its cutting axis 66 intersects the work axis 68 at the center of curvature 84 for the surface.

From the foregoing description, the method and associated apparatus of the present invention will be apparent. It will therefore be appreciated, that a relatively simple yet accurate method is provided for cutting internal spherical surfaces. By controlling the feeding movement of the rotating cutter, the location of the center of curvature of the spherical surface may be accurately determined. On the other hand, the diameter of the spherical surface may be accurately adjusted to a desired value by adjusting the angle of the cutting axis to the work axis dependent also on the diameter of the cutting circle at the forward end of the cutting tool. The method also permits the generation of any selected portion of a full hemisphere.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method for generating an internal spherical surface within a workpiece tangent to a cylindrical bore formed therein comprising the steps of: rotating the workpiece about the axis of said cylindrical bore; rotating a cutting tooth at about a cutting axis to generate a cutting circle less in diameter than that of the cylindrical bore; feeding the rotating cutting tooth through the cylindrical bore to a predetermined location; and displacing the rotating cutting tooth at said predetermined location to bring the cutting circle into contact with the cylindrical bore.

2. A machine for cutting internal spherical surfaces comprising a first rotatable shaft, a toothed cutting tool on one end of the shaft, a second rotatable shaft, a holder on the second shaft for supporting a workpiece, means for journaling said shafts so that their center lines intersect, means for adjustably positioning said journaling means to preselect an angle between said intersecting center lines, and means for advancing the cutting tool parallel to either of said center lines to establish the intersection between said center lines at the center of the spherical surface generated by said cutting tool at said preselected angle to which the journaling means are adjustably position.

3. A method for cutting an internal spherical surface in a workpiece rotated about a fixed work axis utilizing a rotating cutter tooth comprising the steps of: predetermining the dimension and location of the spherical surface to be cut in terms of a circle formed by the intersection of the surface by a plane perpendicular to an axis intersecting the center of curvature of said surface; selecting a cutter having an outer diameter equal to the diameter of said circle; rotating said selected cutter about said axis of the circle; advancing the cutter along one of said axes to establish the intersection therebetween at the center of the curvature; and angularly adjusting the selected cutter to the angle between the axes when intersecting the center of curvature.

References Cited by the Examiner

UNITED STATES PATENTS

| | | |
|---|---|---|
| 1,352,790 | 9/20 | Danielson. |
| 1,949,062 | 2/34 | Marriott et al. _____ 90—15 |
| 2,232,843 | 2/41 | Drissner et al. |
| 2,408,491 | 10/46 | Strickland _____ 90—20 |

WILLIAM W. DYER, Jr., *Primary Examiner.*